United States Patent [19]
Lo et al.

[11] Patent Number: 5,680,171
[45] Date of Patent: Oct. 21, 1997

[54] METHOD AND APPARATUS FOR PRODUCING COMPOSITE IMAGES AND 3D PICTURES

[76] Inventors: Allen Kwok Wah Lo, 5022 Hidden Branches Dr., Dunwoody, Ga. 30338; Kenneth Quochuy Lao, 650 Glen Ave., Westfield, N.J. 07090

[21] Appl. No.: 677,648

[22] Filed: Jul. 8, 1996

Related U.S. Application Data

[63] Continuation-in-part of Ser. No. 654,830, May 28, 1996, which is a continuation-in-part of Ser. No. 637,174, Apr. 24, 1996, which is a continuation-in-part of Ser. No. 632,284, Apr. 15, 1996, which is a continuation-in-part of Ser. No. 559,550, Nov. 16, 1995, which is a continuation-in-part of Ser. No. 349,481, Dec. 2, 1994, Pat. No. 5,625,435, which is a continuation-in-part of Ser. No. 140,681, Oct. 21, 1993, abandoned.

[51] Int. Cl.$^6$ ............................................. H04N 13/00
[52] U.S. Cl. .................... 348/42; 348/46; 348/49; 348/59; 355/22; 355/33
[58] Field of Search ........................ 348/42, 46, 49, 348/96, 106, 294, 335, 340

[56] References Cited

U.S. PATENT DOCUMENTS

| | | | |
|---|---|---|---|
| 1,882,424 | 10/1932 | Ives . | |
| 4,107,711 | 8/1978 | Law | 354/112 |
| 4,945,407 | 7/1990 | Winnek | 348/59 |
| 5,099,320 | 3/1992 | Allio | 358/88 |
| 5,142,357 | 8/1992 | Lipton et al. | 348/48 |
| 5,192,969 | 3/1993 | Igarashi et al. | 355/22 |
| 5,519,533 | 5/1996 | Nomura et al. | 359/478 |
| 5,539,487 | 7/1996 | Taguchi et al. | 396/330 |

OTHER PUBLICATIONS

T. Okoshi "Three–Dimensional Imaging Technique", 1976, pp. 16–17.

Primary Examiner—Howard W. Britton
Assistant Examiner—Frank Snow

[57] ABSTRACT

The method and apparatus for making a composite image of a scene a large-aperture lens to form an image of the scene on a photographic film through a lenticular screen or a barrier strip. The recorded image on film is digitized into a digital image and conveyed to a computer workstation for processing. Assuming the image area in the recorded image under each lenticule is digitized into an image zone composed of N pixel rows in the digital image. To correct the pseudoscopic effect, the order of each group of N pixel rows in each image zone is electronically reversed. Also, the entire digital image is electronically reversed to become a normal composite image. The image reversal process (for the entire image) can also be effected optically by forming the scene image through a plane mirror. The composite image in digital form can be used to produce 3D display, video and hard-copies by presenting the composite image behind a lenticular screen or a barrier strip. A similar method can be used to produce a composite image of a series of M scenes for making animation picture. In addition to the components described above, an aperture plate having an opening the width of which is substantially equal to 1/M of the taking lens aperture is moved to M different positions such that each of the M scenes is formed through a different section of the lens aperture.

38 Claims, 15 Drawing Sheets

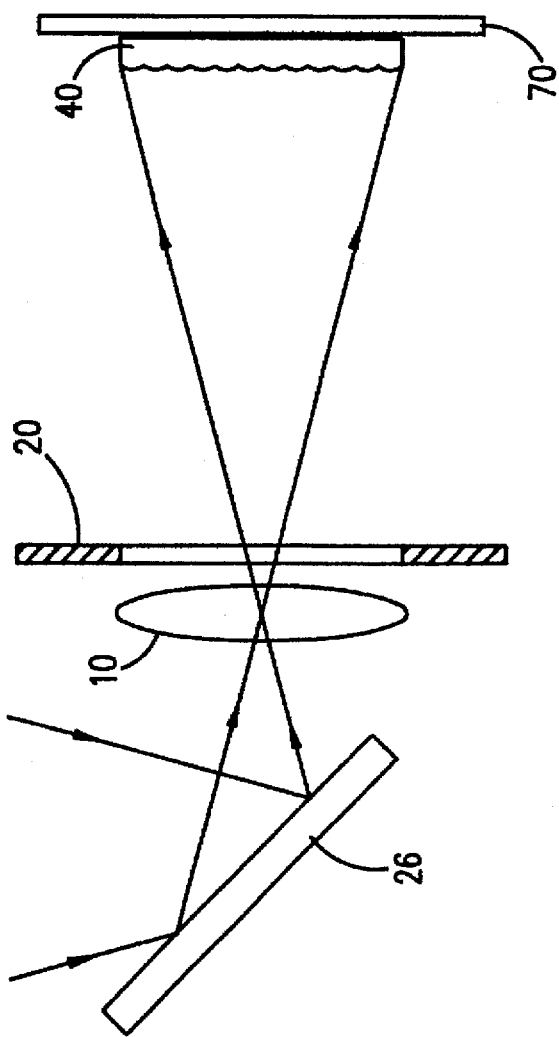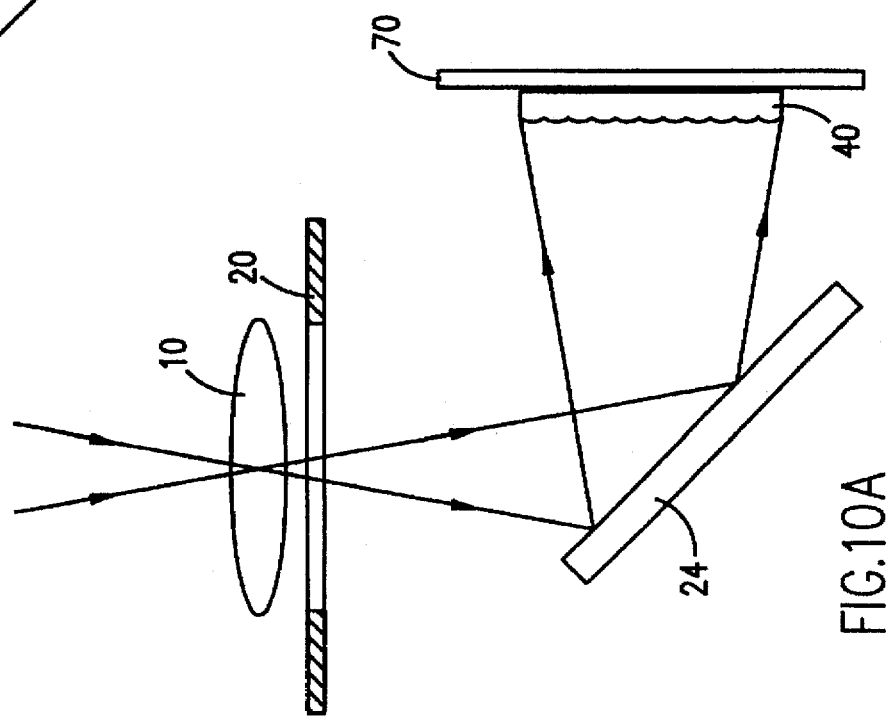
FIG.10B
FIG.10A

METHOD AND APPARATUS FOR PRODUCING COMPOSITE IMAGES AND 3D PICTURES

The current application is a continuation-in-part of applicant's application Ser. No. 08/654,830, filed May 28, 1996, which is a continuation-in-part of the following applications: 1) Ser. No. 08/637,174, entitled "Method and Apparatus for Making 3D Displays", filed Apr. 24, 1996; 2) Ser. No. 08/632,284, entitled "Method and Apparatus for Making Lenticular Pictures", filed Apr. 15, 1996; and 3) Ser. No. 08/559,550, entitled "Method and Apparatus for Producing 3D Video", filed Nov. 16, 1995. The current application is also a continuation-in-part of applicant's U.S. Pat. No. 5,625,435, Ser. No. 08/349,481, filed Dec. 2, 1994, which is a continuation-in-part of Ser. No. 08/140,681, filed Oct. 21, 1993, which is now abandoned.

FIELD OF THE INVENTION

The present invention is related to 3D photography where images of a scene acquired at different angles are composed into a composite image to be viewed through a lenticular screen or a parallax barrier strip.

BACKGROUND OF THE INVENTION

In the past 65 years, a great deal of effort has been made to improve the techniques of producing 3D pictures by using a large-aperture lens for exposure. In his book entitled "Three-Dimensional Imaging Techniques" (Academic Press, 1976, pages 16–17), T. Okoshi points out that an image formed by a large-aperture lens under a slit plate is pseudoscopic. U.S. Pat. No. 1,882,424 (IVES) discloses a method of viewing a composite image formed by a large-aperture lens through a parallax barrier. U.S. Pat. No. 4,107,711 (LAW) discloses a two-step method for optically producing non-pseudoscopic composite images. In the first step, a large-aperture taking lens is used to form a pseudoscopic image of a scene on a photographic film through an overlying lenticular screen. The film is chemically developed to produce a reversed, pseudoscopic three-dimensional original image. In the second step, the original image is placed between a similar lenticular screen and a photographic material, and a light source is used to expose the original image, through the lenticular screen, onto the photographic material. The exposure involves moving at least two of the elements including the lenticular screen, the light beam and the original image in a number of steps to produce a non-pseudoscopic composite image on the photographic material. The above-mentioned disclosed methods are either too complex or too time-consuming.

It is advantageous to provide a simple method and apparatus for producing composite images while improving the quality of the 3D pictures, animation pictures or 3D displays using the composite images so produced.

SUMMARY OF THE INVENTION

It is an objective of the present invention to provide a simple method and apparatus for producing composite images of a scene for 3D viewing.

It is another objective of the present invention to provide a method and apparatus for producing composite images of moving objects as well as still objects wherein 2D views as viewed from different angles are simultaneously captured.

It is yet another objective of the present invention to provide a method and apparatus for producing composite images of a scene for 3D viewing composed from a plurality of 2D views wherein the 2D views are automatically aligned with each other.

It is another objective of the present invention to provide a simple method for producing 3D video, 3D projection, 3D displays and 3D hard-copies.

It is a further objective of the present invention to provide a simple method for producing composite images for making animation pictures.

These objectives can be achieved by recording an image of a scene formed by a large-aperture taking lens through a lenticular screen or a parallax barrier strip plate on a photographic film, or photographic plate, disposed in the image plane of the taking lens. Preferably, the lenticular screen is oriented such that the lenticules are parallel to the vertical axis, but they can be oriented in other directions. The aperture of the taking lens must be sufficiently large to substantially cover the entire viewing angle of the lenticules so that an image formed by the taking lens properly exposes the image area on the photographic film under each lenticule. It should be reminded that the image formed under the lenticular screen is a pseudoscopic, reversed image (mirror image) of the scene. The recorded image on film is digitized using an image digitizer such as an image scanner, and the image data conveyed to a computer workstation for processing. It is understood that the digital image of the image recorded on film comprises a plurality of rows and columns of pixels and the image area under each lenticule is composed from a group of N pixel rows, where N is an integer ranging from 2 to 100 or more. In order to correct the pseudoscopic effect, the order of each group of N pixel rows in each image area formed under a lenticule is electronically reversed. Also, the entire digital image is electronically reversed to become a normal composite image. The image reversal process (for the entire image) can also be effected optically by placing a plane mirror in front or in the rear of the taking lens so that the image formed by the taking lens is formed through the reflection of the mirror. The composite image in digital form can be used to produce 3D display on a video screen or a projection screen. It can be used for making 3D hard-copies. It should be further reminded that, with the method and apparatus according to the present invention, the photographic film records the compressed images of a number of 2D views of a scene at different viewing angles simultaneously. Thus, this method and apparatus can be used to produce 3D images of moving objects as well as still objects. Also, because the images of all the 2D views at different viewing angles are formed by the same taking lens, they are perfectly aligned with each other. Thus, the key-subject alignment process in 3D photography is avoided. It is understood that the image recorded on the photographic film can be negative or positive. If the image is negative, it can be easily converted into a positive image after it is digitized into a digital image.

A similar method can be used to produce a composite image of a series of N scenes for making animation picture. In addition to the components described above, an aperture plate having an opening the width of which is substantially equal to 1/N of the taking lens aperture is used to control the transmission of light through the taking lens, and a moving means is used to move the aperture plate to different positions so that the image of each of the N scenes is formed through a different aperture section of the taking lens. The movement of the aperture plate is along a direction perpendicular to the longitudinal axis of the lenticules of the lenticular screen disposed above the photographic film.

It should be noted that a parallax barrier strip plate has the same function as that of a lenticular screen. Thus, a barrier strip plate can be disposed, in lieu of a lenticular screen, between the taking lens and the photographic film to separate the views, or the images formed through different aperture sections of the taking lens. It can also be overlaid on a composite image to separate the views as viewed at different angles. Hence, the terms lenticular screen and barrier strip plate are, in fact, interchangeable in this disclosure.

The objectives and the scope of the present invention will become apparent upon reading the detailed descriptions in reference to the following drawing figures.

BRIEF DESCRIPTION OF THE DRAWING

FIGS. 10A and 10B illustrate two methods to optically reverse the image recorded on a photographic film through a lenticular screen.

DETAILED DESCRIPTION OF THE INVENTION

Figure 1:
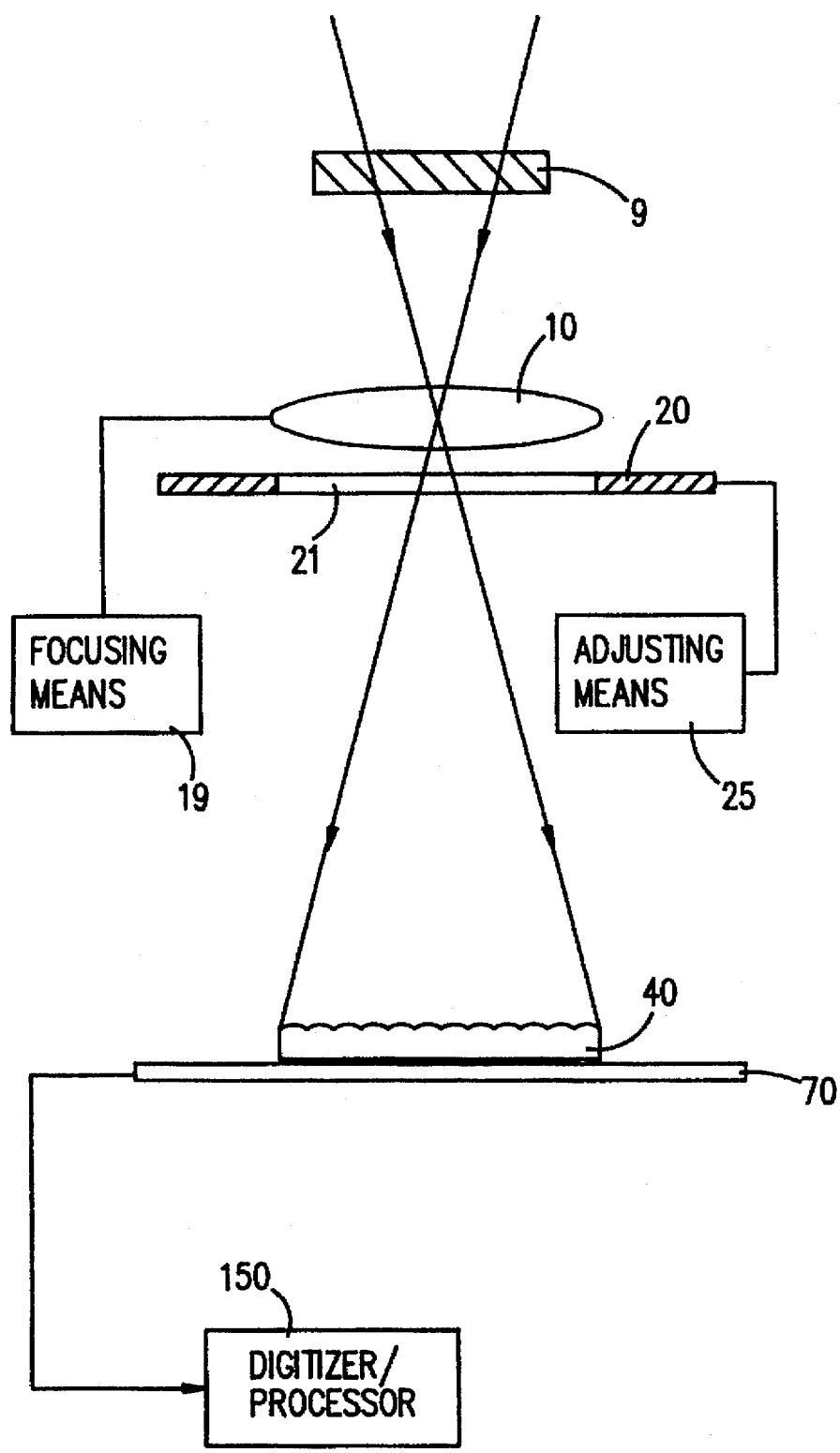
FIG. 1 illustrates the method and apparatus for producing composite images of a scene, according to the preferred embodiment of the present invention.

FIG. 1 illustrates the method and apparatus for producing composite images of a scene, according to the preferred embodiment of the present invention. As shown in FIG. 1, a large-aperture taking lens 10 is used to expose an image of a scene on a photographic film 70 disposed in the image plane of the taking lens 10. A lenticular screen 40 is disposed in front of the film 70 to separate the images of the scene as formed through different aperture sections of the taking lens 10. Preferably, focusing means 19 is used to focus the taking lens 10 and an aperture plate 20 with an adjustable opening 21 is used to control the effective aperture of the taking lens 10. The width of the opening 21 can be adjusted by adjusting means 25. The shape of the opening 21 can be rectangular or any other shape, or it can be designed to correct for the vignetting and to improve the light intensity distribution on the image area underlying each lenticule. A shutter 9 is used to control the exposure. After the film 70 is exposed and chemically processed, it is digitized by a digitizer/processor 150 into a digital image which is electronically processed to become a composite image in digital form. The digitizer/processor 150 may comprises storage means for storing the digital images after or before being electronically processed. The digitizer/processor 150 comprises an image scanner, a CCD camera or any imaging device capable of converting an image recorded on film into digital image data.

Figure 2:
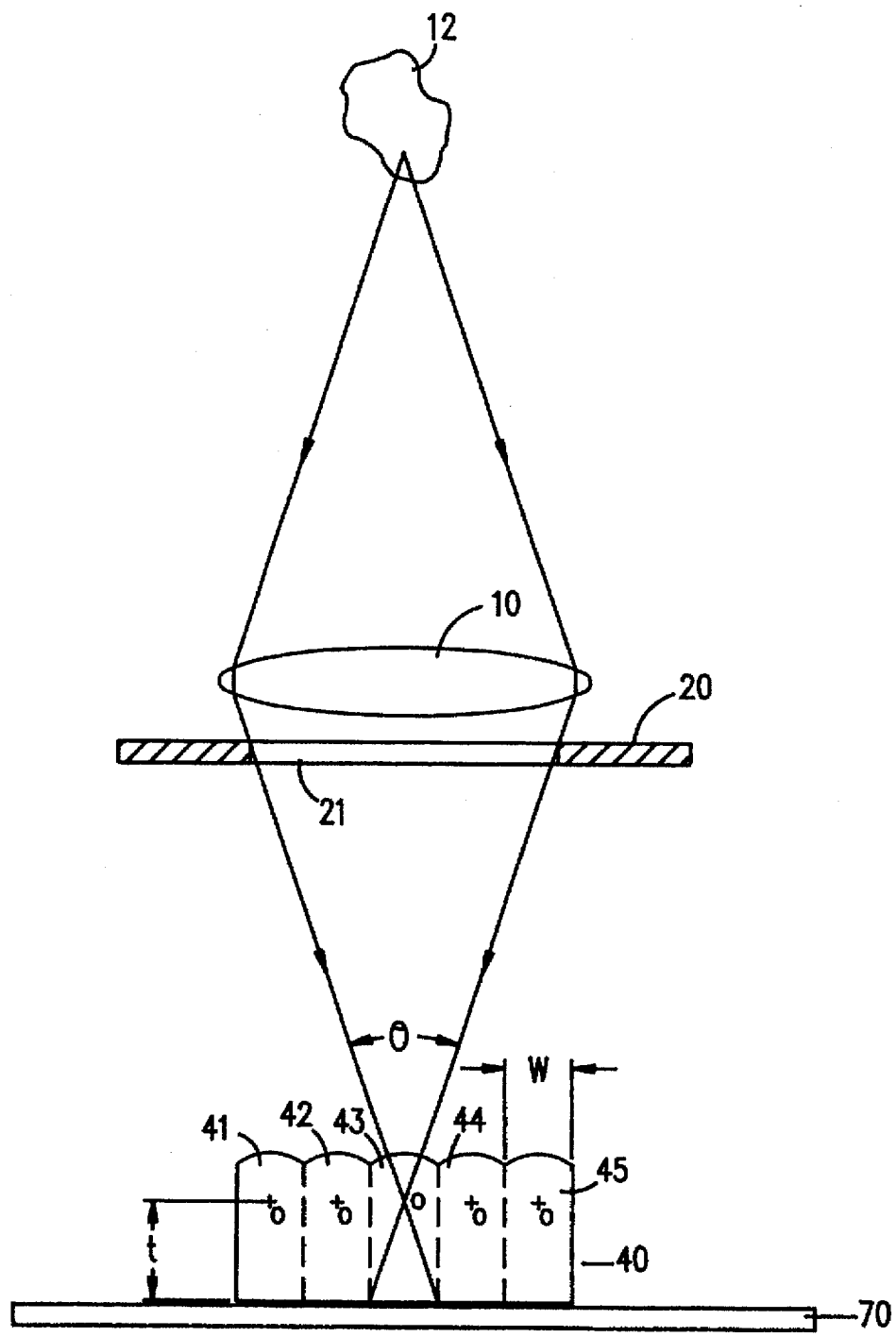
FIG. 2 illustrates the relationship between the effective aperture of the taking lens and the lenticules on a lenticular screen.

FIG. 2 illustrates the relationship between the effective aperture of the taking lens and the total viewing angle of the lenticules of a lenticular screen. For illustrative purposes only, FIG. 2 shows a lenticular screen 40 having five lenticules denoted by numerals 41, 42, 43, 44 and 45, disposed on top of the photographic film 70. The width of the lenticules is denoted by W. Letter o denotes the center of curvature of each lenticule and letter t denotes the thickness of the lenticular screen as measured from the center of curvature. When the taking lens 10 is properly focused on the photographic film 70 to form an image of a scene 12, the opening 21 of the aperture plate 20 is adjusted so that the angle subtended by the opening 21 in the image plane of the taking lens 10 is substantially equal to or slightly larger than the total viewing angle $\Theta$ of the lenticules. The total viewing angle $\Theta$ is given by $2\tan(W/2t) \approx W/t$. With the opening 21 of the aperture plate 20 being properly adjusted, the image formed by the taking lens will properly fill the image area underlying each lenticule.

Figure 3:
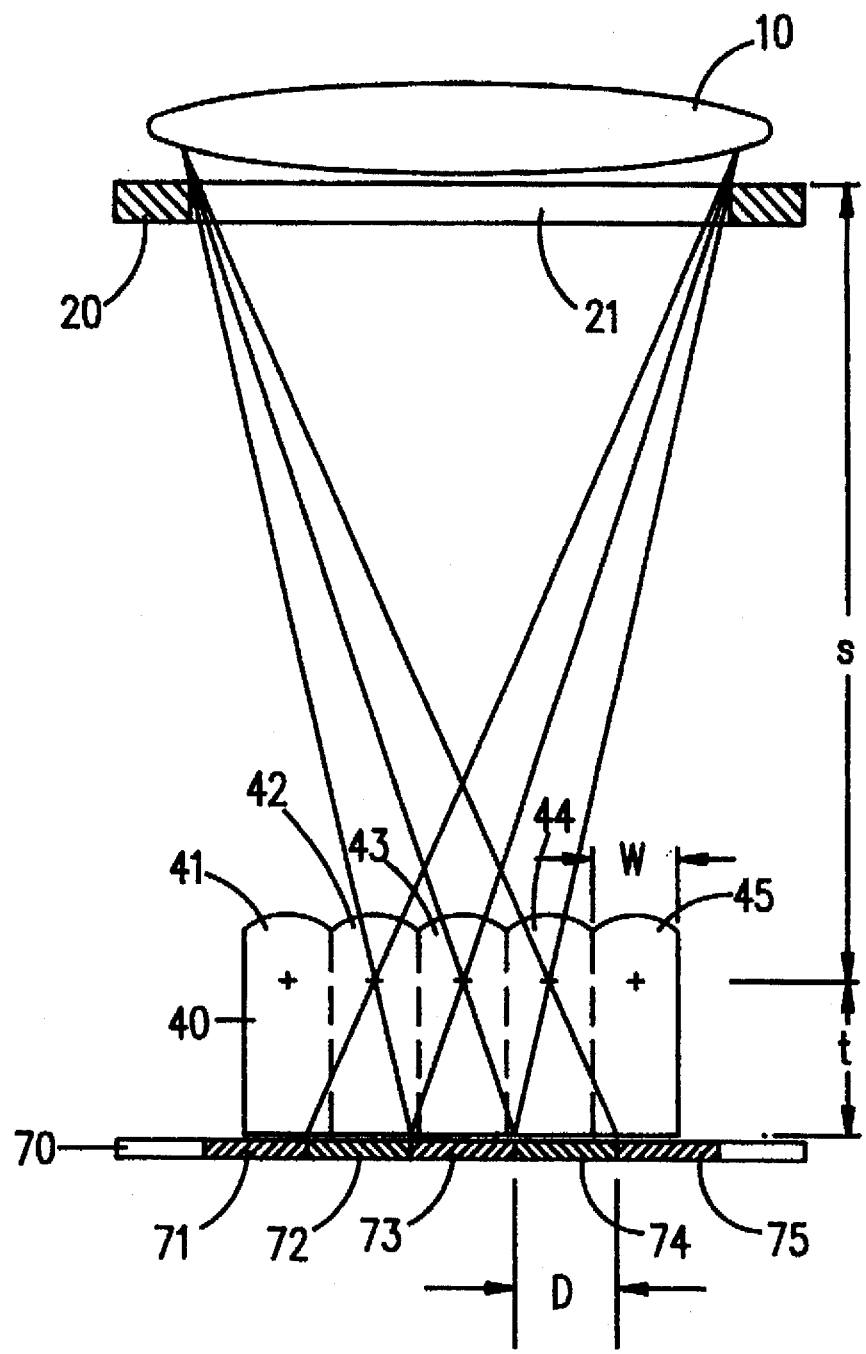
FIG. 3 shows the relationship of between the width of the image area underlying each lenticule and the width of the lenticules.

FIG. 3 shows the relationship of between the width of the image area underlying each lenticule and the width of the lenticules. In FIG. 3, the image formed on the photographic film 70 comprises five linear image zones 71, 72, 73, 74 and 75 under lenticules 41, 42, 43, 44 and 45, respectively. The width, D, of the image zones is slightly greater than the width, W, of the lenticules due to the finite image distance S and the thickness t of the lenticular screen 40. The width D is substantially equal to the shearing width $W(S+t)/S$. In practice, the ratio (t/S) is usually on the order of 0.01 or smaller and D is only slightly greater than W. It should be noted that the image formed on photographic film 70 under the lenticular screen 40 is a pseudoscopic, reversed composite image of the scene. It can be electronically processed to become a normal composite image.

Figure 4:
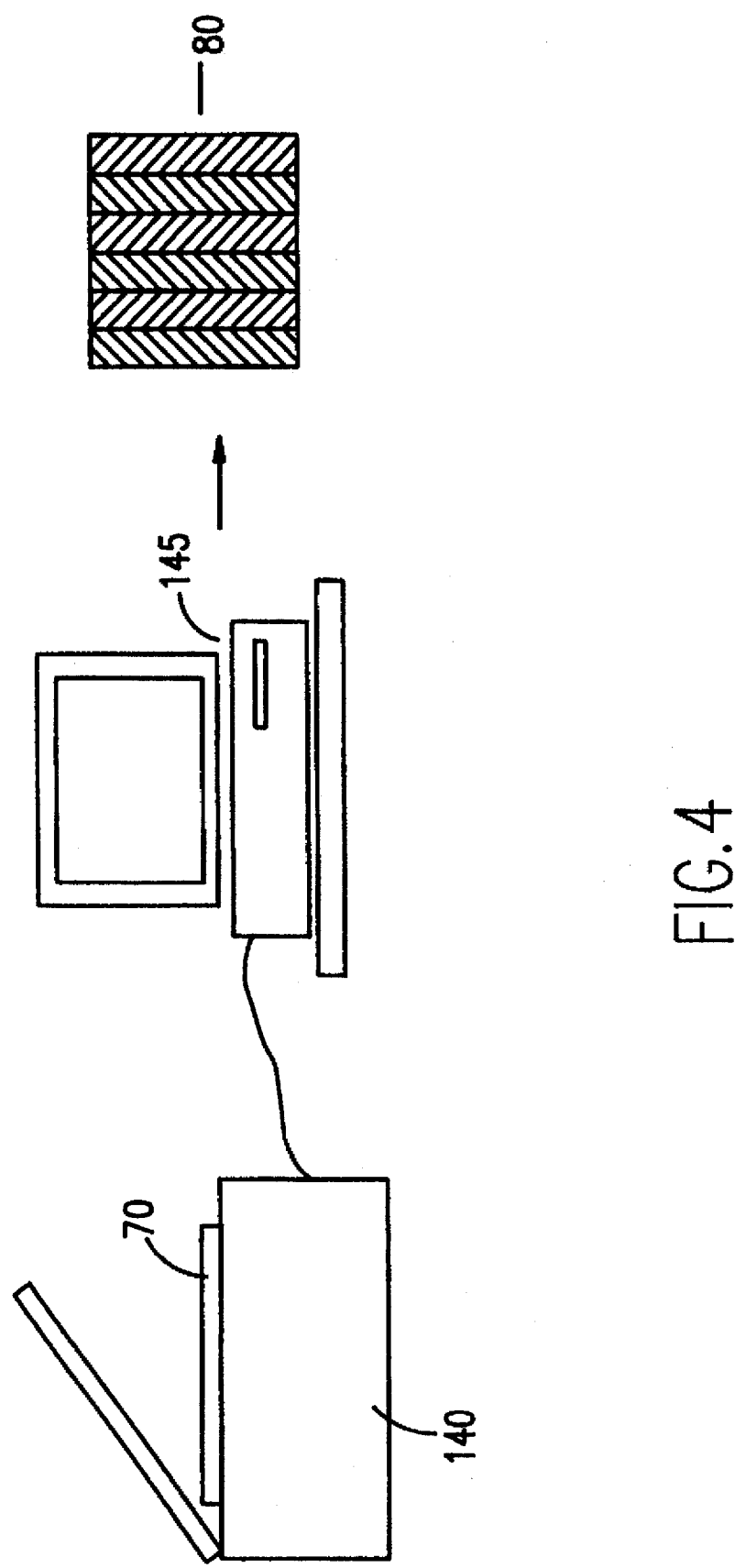
FIG. 4 illustrates the image recorded on film being digitized into a digital image.

FIG. 4 illustrates an image recorded on film being digitized into a digital image. As shown in FIG. 4, the image recorded on photographic film 70 is digitized by an image scanner 140 into a digital image, and the digital image data are conveyed to a computer workstation 145 for processing. The digital image as digitized is denoted by numeral 80.

Figure 5:
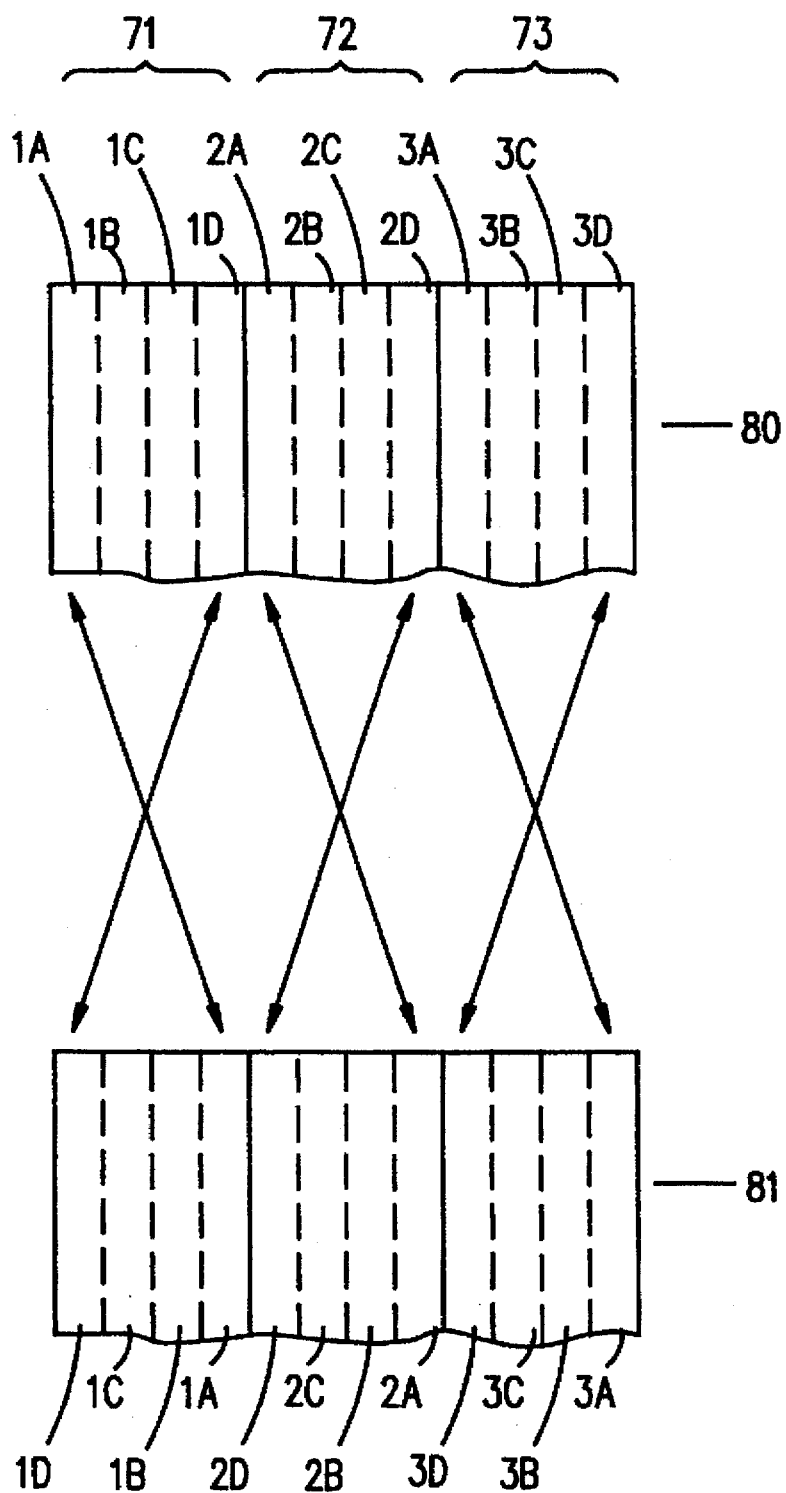
FIG. 5 illustrates the digitized image of the image recorded on film being electronically processed to correct the pseudoscopic effect.

FIG. 5 illustrates the digitized image being electronically processed to correct the pseudoscopic effect. In FIG. 5, numeral 80 denotes the digital image of the image recorded on film 70 comprising linear image zones 71, 72, 73, 74 and 75 as shown in FIG. 3. The digital image 80 comprises rows and columns of pixels. For illustrative purposes only, the linear image zone 71 is digitized into a digital image section consisting of 4 pixel rows (1A, 1B, 1C, 1D); the image zone 72 digitized into image section (2A, 2B, 2C, 2D), etc. The number of pixel rows in each section can be 2 to 100 or more, depending to the resolution of the digitizer and the width of the lenticular screen through which the image is formed on film. In order to correct the pseudoscopic effect, the order of the pixel rows within each image zone is reversed to become a non-pseudo digital image 81. In this local row reversal process, the pixel rows in the image section (1A, 1B, 1C, 1C) are rearranged to become (1D, 1C, 1B, 1A), and so forth. After the local row reversal process is completed, the non-pseudo digital image 81 is now composed from pixel rows (1D, 1C, 1B, 1A, 2D, 2C, ..., 4A, 5D, 5C, 5B, 5A). However, the non-pseudo digital image 81 is still a reversed image (mirror image). It can be electronically reversed to become a normal composite image.

Figure 6:
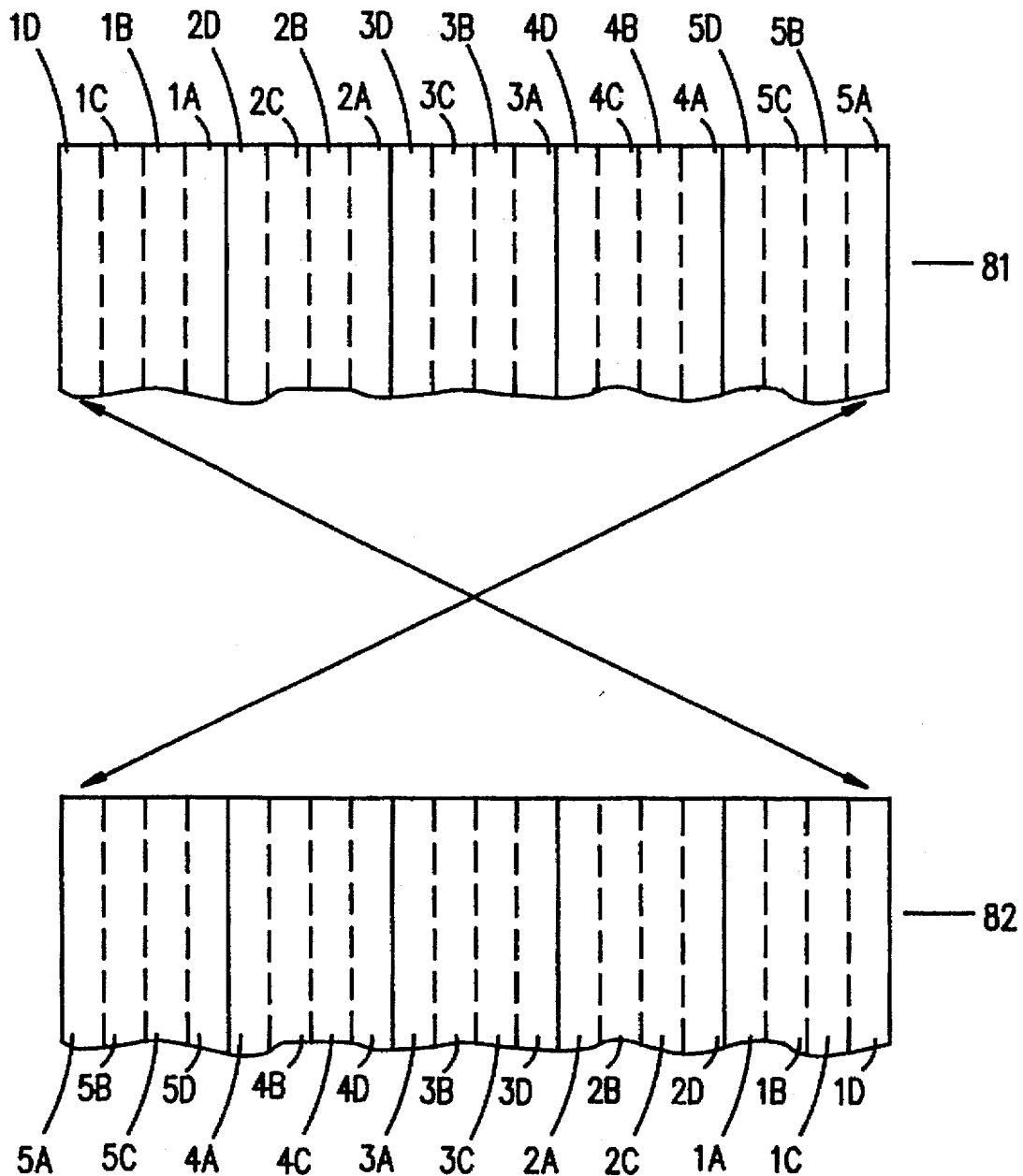
FIG. 6 illustrates an electronic process to convert a mirror image into a normal composite image.

FIG. 6 illustrates a non-pseudo digital image 81 being converted into a normal digital composite image by reversing the order of the pixel rows of the entire image. As shown in FIG. 6, after the order of pixel rows of the entire image is reversed, the pixel rows in the normal composite image 82 are (5A, 5B, 5C, 5D, 4A, ..., 2D, 1A, 1B, 1C, 1D). It should be noted that the image can also be reversed by reversing the order of the pixel columns of the entire image. Furthermore, the image reversal process can be eliminated if the image of the scene is acquired through the reflection of a plane mirror as discussed in reference to FIG. 10.

Figure 7A:
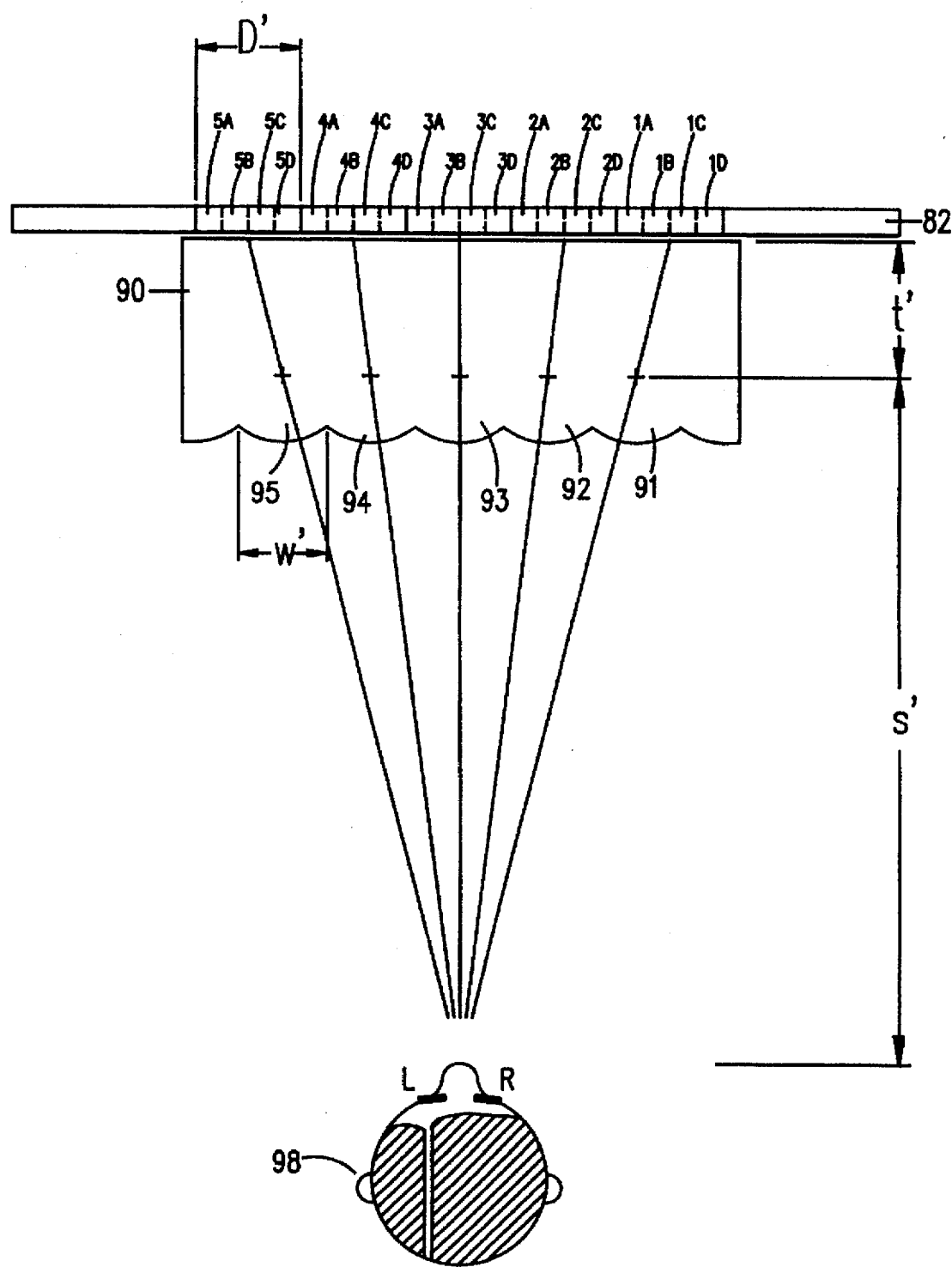
FIGS. 7A and 7B illustrate a composite image being presented behind a viewing screen to produce a 3D picture.

FIG. 7 illustrates a digital composite image being presented behind a viewing screen to produce a 3D picture. In FIG. 7A, the composite image 82 is presented behind a lenticular screen 90, to be viewed by a viewer 98 at a viewing distance S'. The composite image 82 can be magnified to a desired size. The width of each image section (5A, 5B, 5C, 5D), etc. behind the lenticular screen is denoted by D'. The lenticules on the lenticular screen 90 are denoted by numerals 91, 92, ..., 95, and the width of the lenticules is denoted by W'. When taking into consideration the shearing effect due to the thickness t' of the lenticular screen 90, the width W' of the lenticules on the lenticular screen 90 must be selected such that W'(S'+t')/S' is substantially equal to D'. In practice, the ratio (t'/S') is on the order of 0.01 or smaller, and D' is only slightly greater than W'. The presented composite image 82 must also be properly aligned with the lenticular screen 90 such that the pixel rows in each image section are properly aligned with a corresponding lenticule. As shown, the image section (3A, 3B, 3C, 3D) is aligned with the lenticule 93, etc.

Figure 7B:
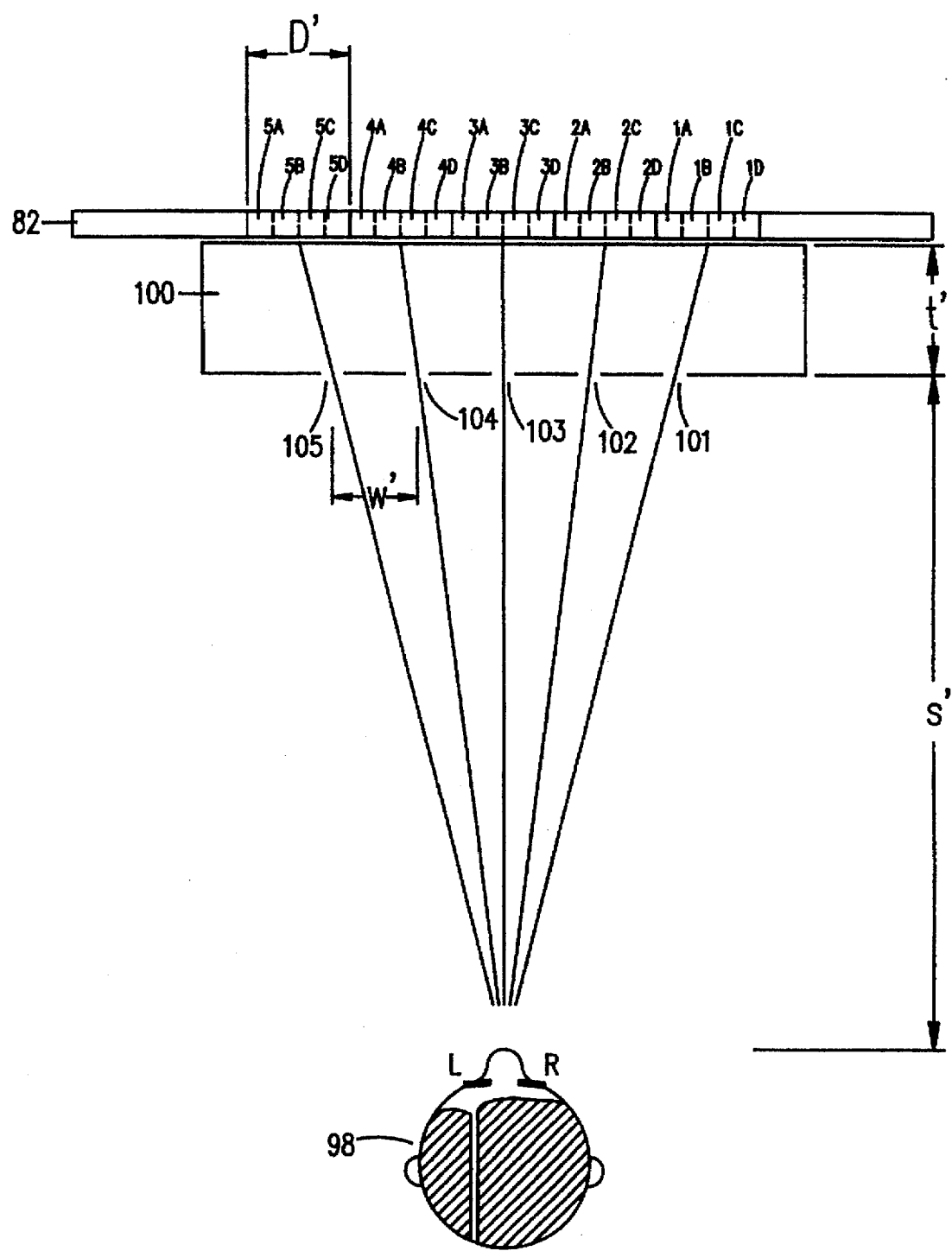

FIG. 7B shows a barrier strip plate being used to view the composite image in lieu of a lenticular screen. Similar to the arrangement shown in FIG. 6A, the composite image 73 is presented behind a barrier strip plate 100 to be viewed by a viewer 98 at a viewing distance S'. The barrier strip plate comprises a plurality of linear blocking strips and clear strips. The clear strips are labeled by numerals 101, 102, ..., 105. The center-to-center distance between two adjacent clear strips, or the pitch, is denoted by W'. When taking into consideration the shearing effect due to the thickness t' of the barrier strip plate, the pitch W' of the barrier strip plate 100 must be selected such that W'(S'+t')/S' is substantially equal to D', the width of each image section in the presented composite image 82. The presented composite image 82 must also be properly aligned with the barrier strip plate 100 such that the pixel rows in each image section are properly aligned under a clear strip. As shown, the image section (3A, 3B, 3C, 3D) is aligned with the clear strip 103, etc.

Figure 8:
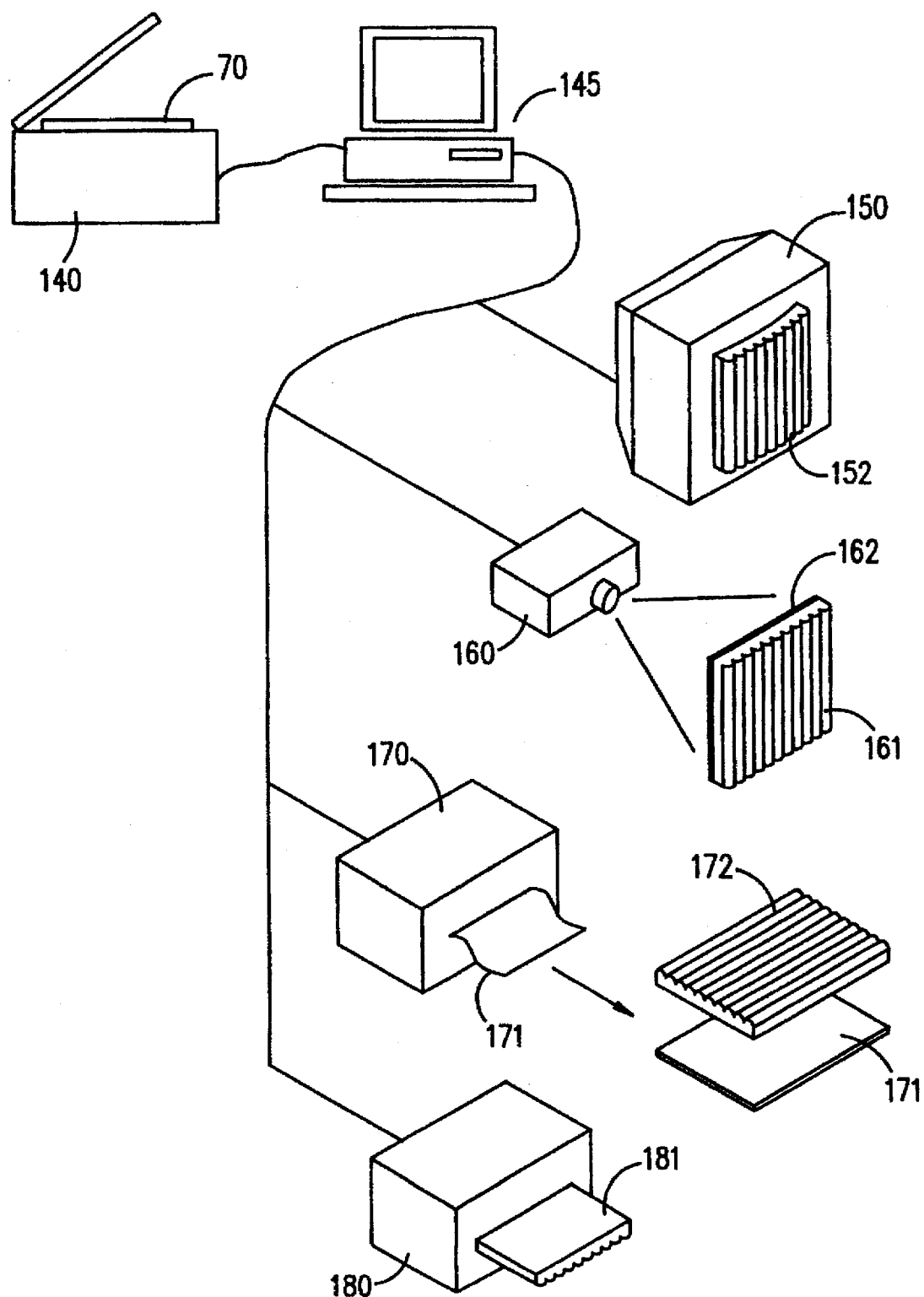
FIG. 8 illustrates the various applications of composite images.

FIG. 8 illustrates the various applications of the composite images. In FIG. 8, an image scanner 140 is used to digitize an image recorded on photographic film 70. The digital image data are conveyed to a computer workstation 145 to be processed into a digital composite image as described in reference to FIG. 5 and FIG. 6. The composite image can be presented to various media to produce 3D pictures. The digital composite image can be conveyed to:

1) a CRT monitor 151 to be displayed on the monitor screen which is overlaid with a viewing screen 152;

2) a projector 160 to be projected behind a viewing screen 161. Preferably, the backside of the viewing screen 161 is attached to or coated with a diffuse layer 162 to improve the viewing quality. The projector 160 may comprise a matrix light-valve such as an LCD panel for displaying the composite image;

3) a printer 170 to be printed on a sheet of print material 171 and the printed composite image is overlaid with a viewing screen 172; and 4) a printer 180 which prints the composite image directly onto the backside of a viewing screen 181.

The viewing screens shown in FIG. 8 are lenticular screens as illustrated in FIG. 7A, but they can also be barrier strip plates as illustrated in FIG. 7B. The printer 170 in Item (3) can be an inkjet printer, thermal wax printer, dye sublimation printer, plotter or a laser printer. Furthermore, the composite image 82 can be further separated into color components of RGB (red, green, blue), CMY (cyan, magenta, yellow) or CMYK (cyan, magenta, yellow, black) to be printed on a lithographic printer.

Figure 9A:
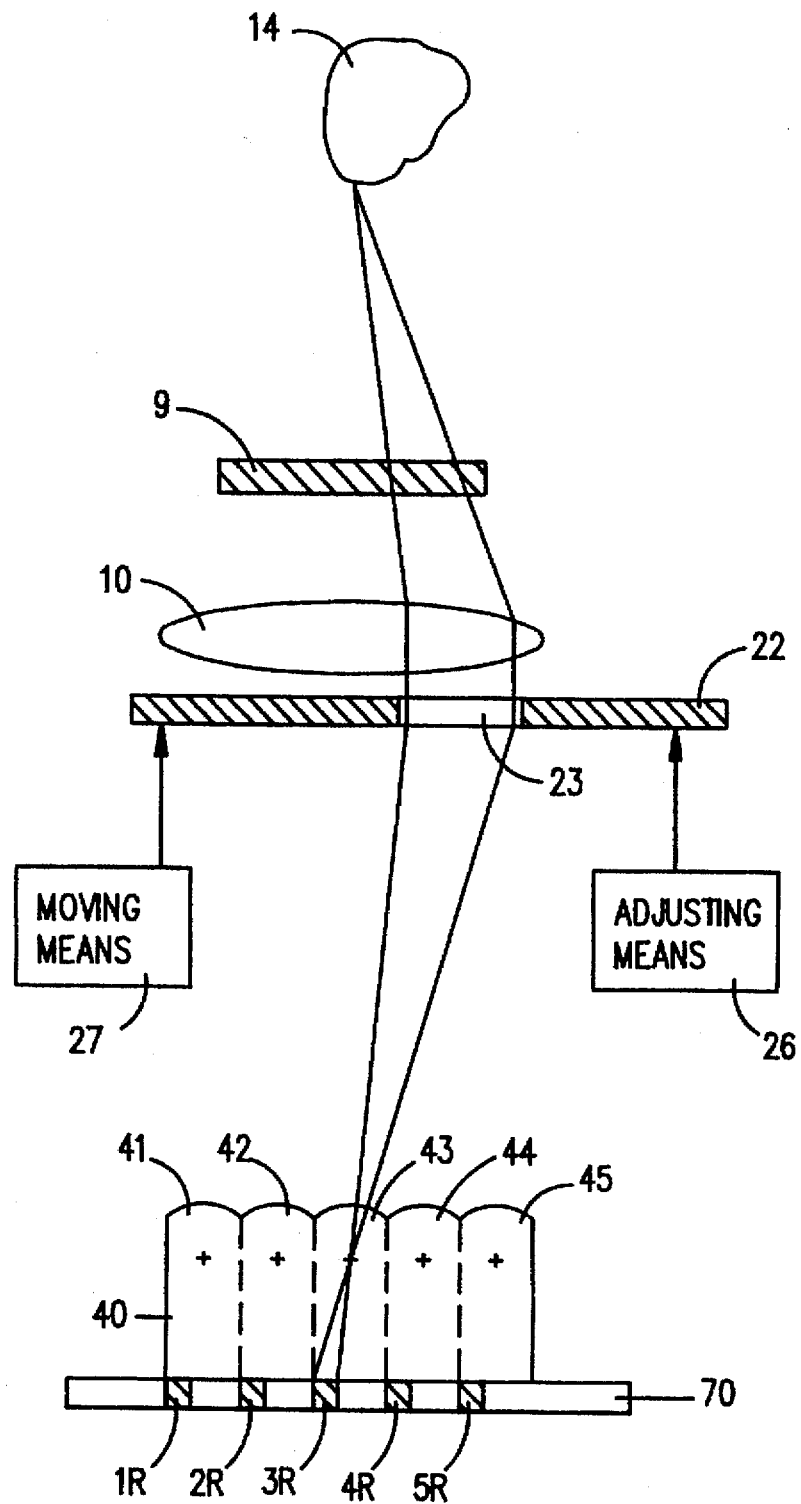
FIGS. 9A, 9B and 9C illustrate a method and apparatus for producing composite image of multiple scenes.
Figure 9B:
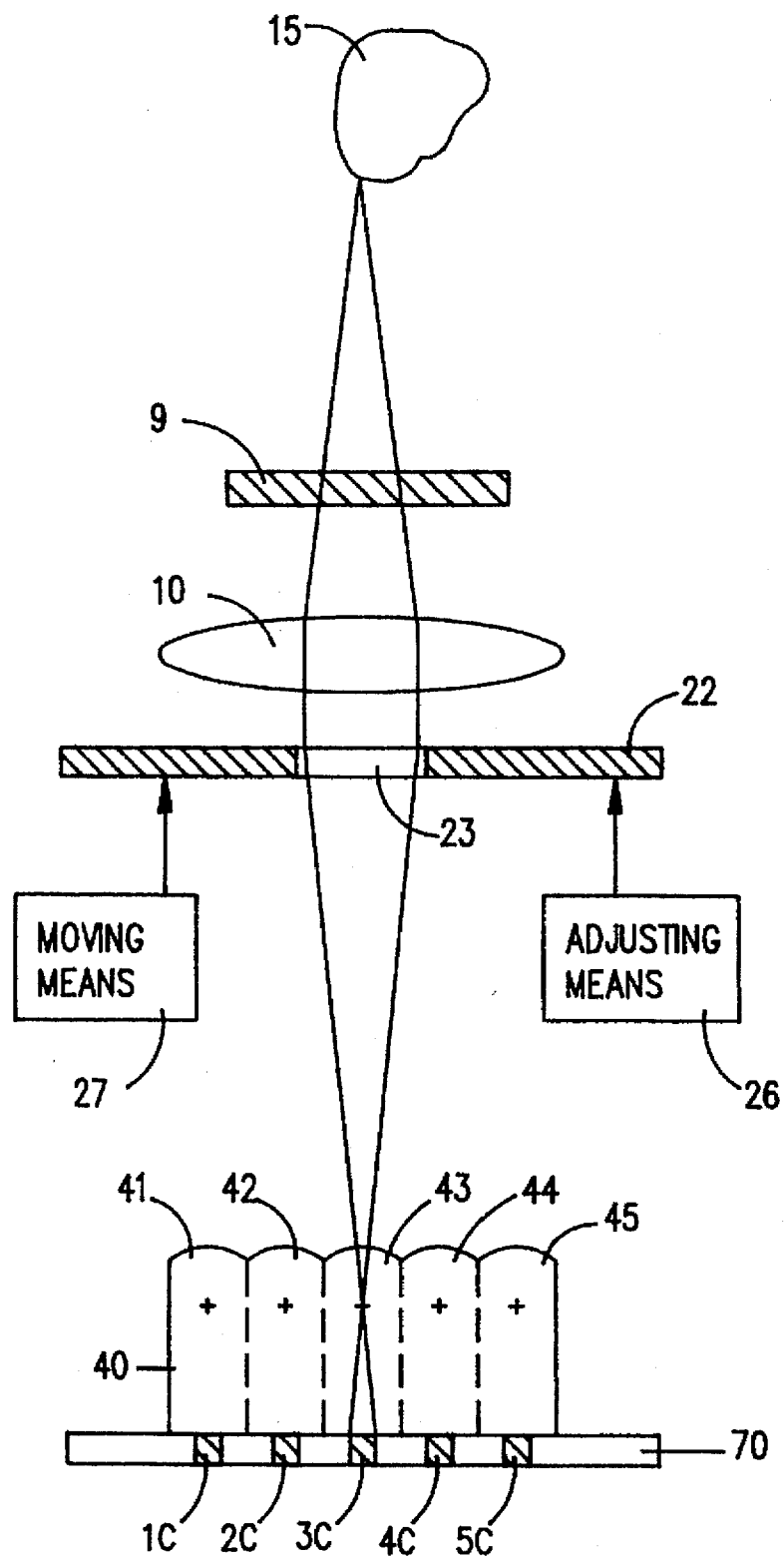
Figure 9C:
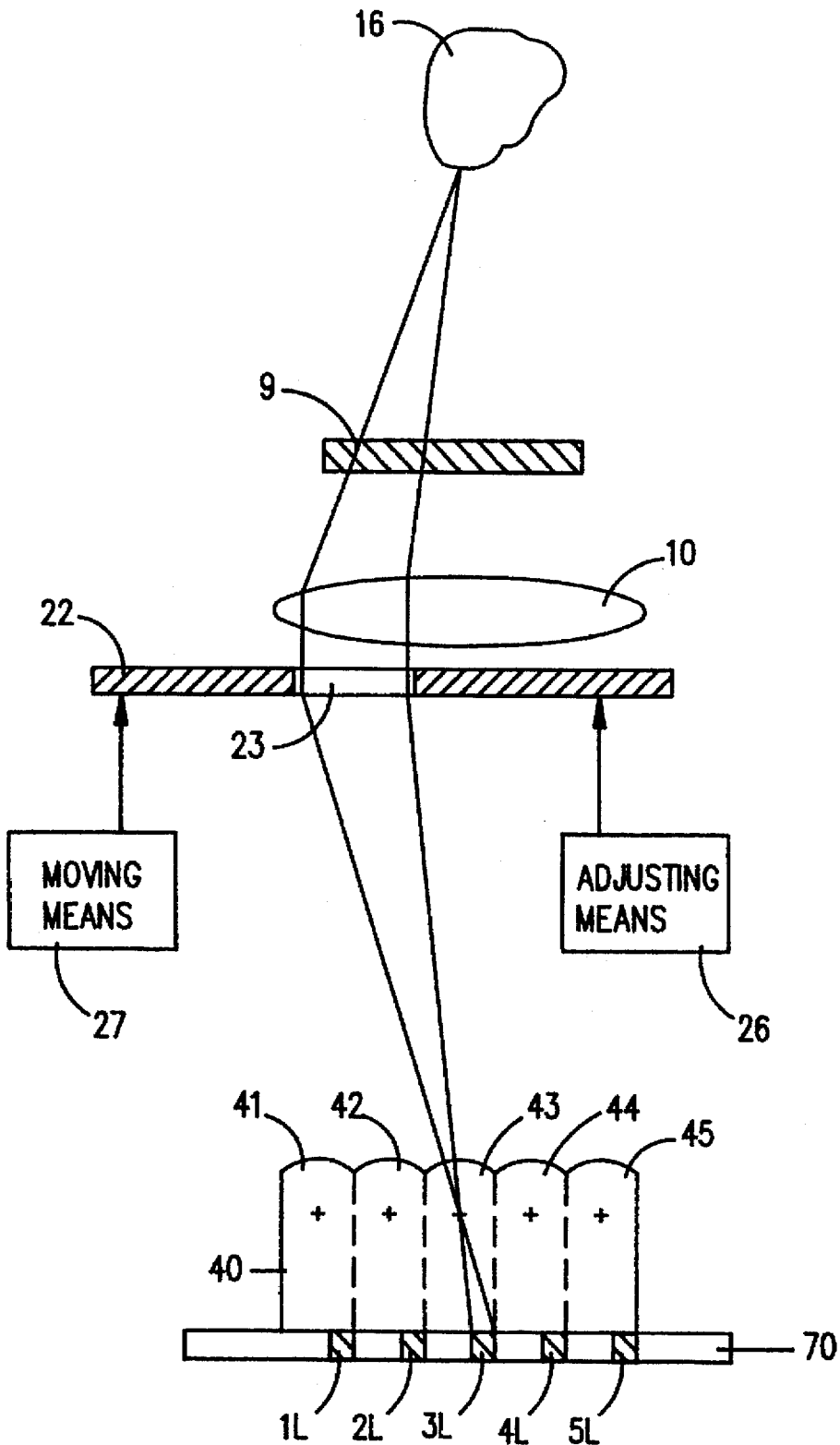

FIG. 9 illustrated a method and apparatus, according to the present invention, for producing a composite image of N scenes which are used for making animation pictures, where N is an integer ranging from 2 to 100 or more. In FIG. 9, for illustration purposes only, the apparatus is setup to produce a composite image of 3 scenes, or N=3. A large-aperture taking lens 10 is used to expose each of the 3 scenes through a different section of the lens aperture and through a lenticular screen 40 onto a photographic film 70 which is disposed in the image plane of the taking lens 10. An aperture plate 22 having an opening 23 which control the transmission of light through the taking lens 10 is used to select the lens aperture section through which an image is exposed. The aperture plate 22 is moved by moving means 26 to different positions along a direction perpendicular to the longitudinal axis of the lenticules on the lenticular screen 40. Preferably, the opening 23 is adjustable by adjusting means 27 so that the width of the opening is substantially equal to 1/N the aperture of the taking lens 10 where N is the number of scenes composing the composite image. It is understood that the width of the opening 23 can be smaller or larger than 1/N the lens' aperture. In FIG. 9, the width of the opening 23 is substantially equal to ⅓ the lens aperture. A shutter 9 is used for exposure control. In FIG. 9A, the opening 23 is located on the right side of the taking lens 10 such that the image of scene 14 is formed through the right section of the taking lens aperture, exposing on the film 70 an array of image strips under the lenticules. The width of the image strips is about ⅓ the image area on under each lenticule. As shown in FIG. 9A, numerals 1R, 2R, 3R, 4R and 5R denote the exposed image strips under lenticules 41, 42, 43, 44 and 45, respectively. In FIG. 9B, the opening 23 is located at the center, and the image of scene 15 is formed through the middle section of the taking lens aperture, exposing image strips 1C, 2C, 3C, 4C and 5C under the respective lenticules. In FIG. 9C, the opening 23 is located on the left side and the image of scene 16 is formed through the left section of the taking lens aperture, exposing image strips 1L, 2L, 3L, 4L and 5L under the respective lenticules. The line-form image recorded on the photographic film 70 can be digitized and electronically processed into a digital composite image using the same procedures as described in reference to FIG. 5 and FIG. 6; and the composite image can be used in many different ways as described in reference to FIG. 7 and FIG. 8. It should be noted, however, that the image of multiple scenes recorded on film through a lenticular screen may be different from the image of a single scene recorded on film through a lenticular screen in that the multiple-scene image may not show the pseudoscopic effect if the image strips from any two scenes do not produce parallax in the viewer's eyes. In that case, the local row reversal process to correct the pseudoscopic effect as described in reference to FIG. 5 can be avoided. Furthermore, the image recorded on film 70 can be directly used as a composite image without electronically reversing the entire image. One way to use this composite image is to overlay a viewing screen on top of the composite image on the backside of the film 70 when viewing. The other way is to reverse the image optically before it is recorded on film, as shown in FIG. 10.

FIG. 10 illustrates the methods to optically reversal the image recorded on a photographic film through a lenticular screen. As shown in FIG. 10A, a plane mirror 24 is disposed behind the taking lens 10 and aperture plate 20 for reflecting the image formed by taking lens 10 onto a photographic film 70 through a lenticular screen 40. FIG. 10B shows a plane mirror 26 disposed in front of the taking lens 10 so that the taking lens views a scene through the reflection of the mirror.

Figure 11:
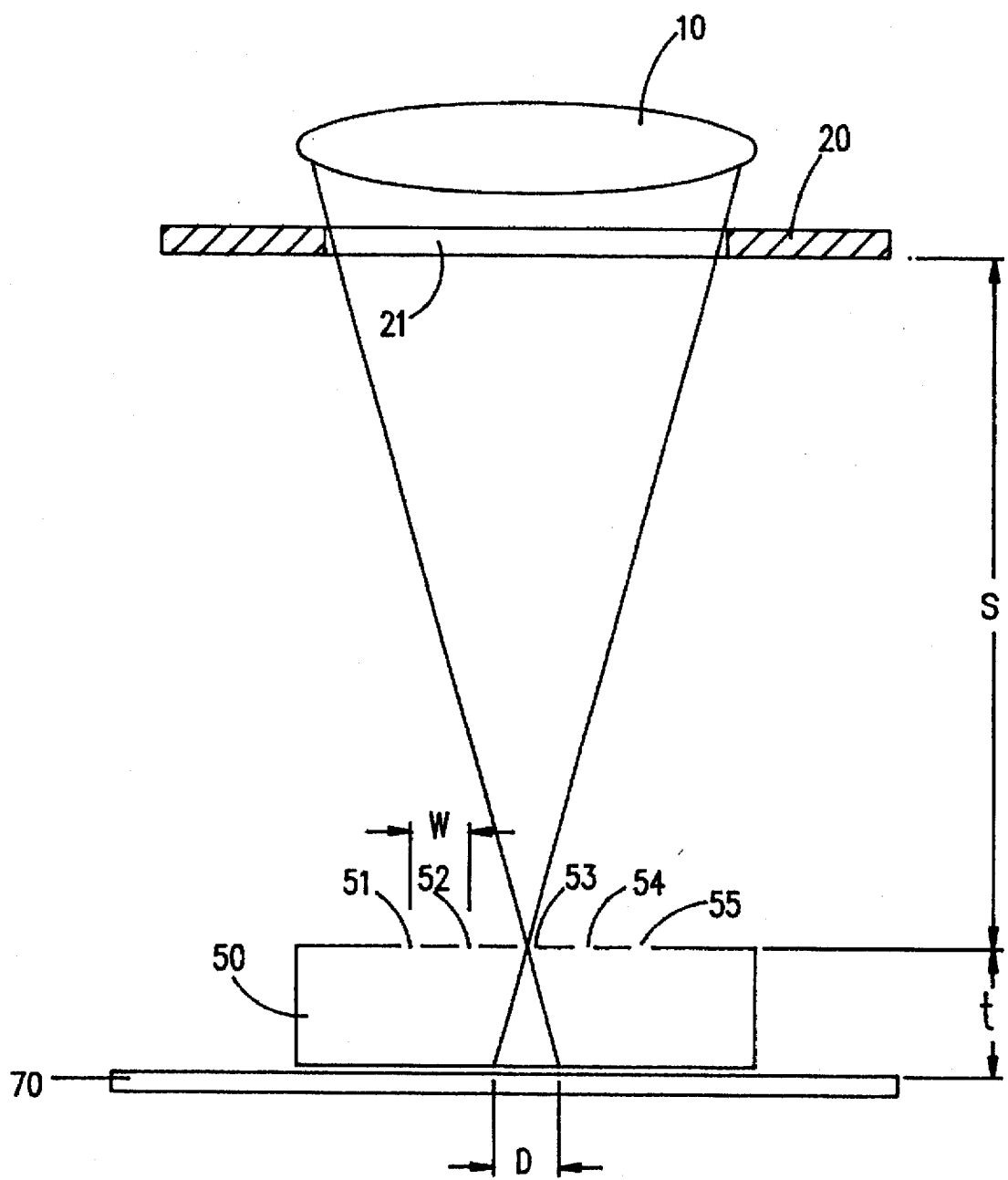
FIG. 11 illustrates another embodiment of the present invention where a barrier strip plate is used instead of a lenticular screen.

FIG. 11 illustrates another embodiment of the present invention. It should be noted that the lenticular screen 40 shown in FIG. 1, FIG. 2, FIG. 3, FIG. 9, and FIG. 10 can be replaced by a parallax barrier strip plate to separate the images formed through different aperture sections of the taking lens 10. Each of these images is a 2D view as viewed at a different angle. As shown in FIG. 11, a barrier strip plate 50 is disposed above the photographic film 70. The barrier strip plate 50 comprises alternate blocking strips and clear strips. For illustrative purposes only, the barrier strip plate 50 comprises only 5 linear dear strips 51, 52, 53, 54, 55. The center-to-center distance between two adjacent clear strips defines the pitch W of the barrier strip plate. Preferably, the opening 21 on the aperture plate 20 is adjustable so that the width, D, of the image area formed under each dear strip is substantially equal to W(S+t)/S. Furthermore, the opening 21 can be adjusted by adjusting means 25 so that its width is substantially equal to D/N, and its position can be relocated by moving means 27, when the photographic film 70 is used to recorded the composite image of N scenes, as described in reference to FIG. 9.

Figure 12A:
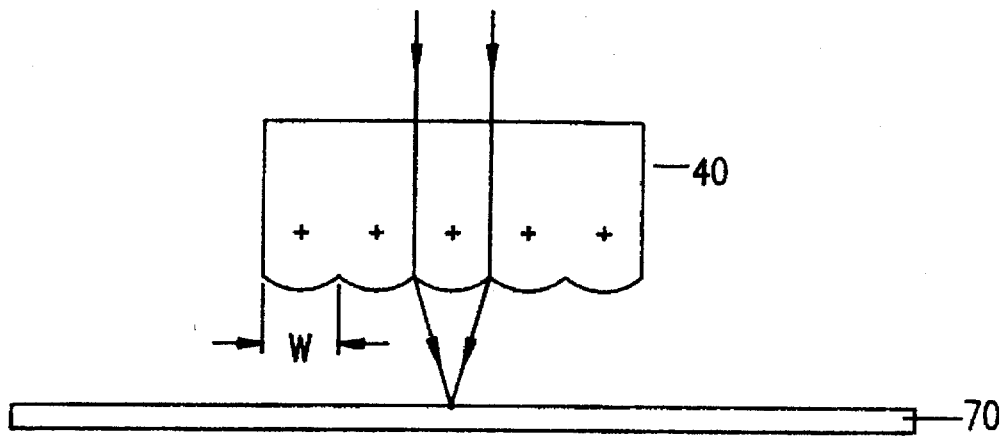
FIGS. 12A and 12B illustrate a different way to dispose a lenticular screen above an imaging medium or a displaying medium.
Figure 12B:
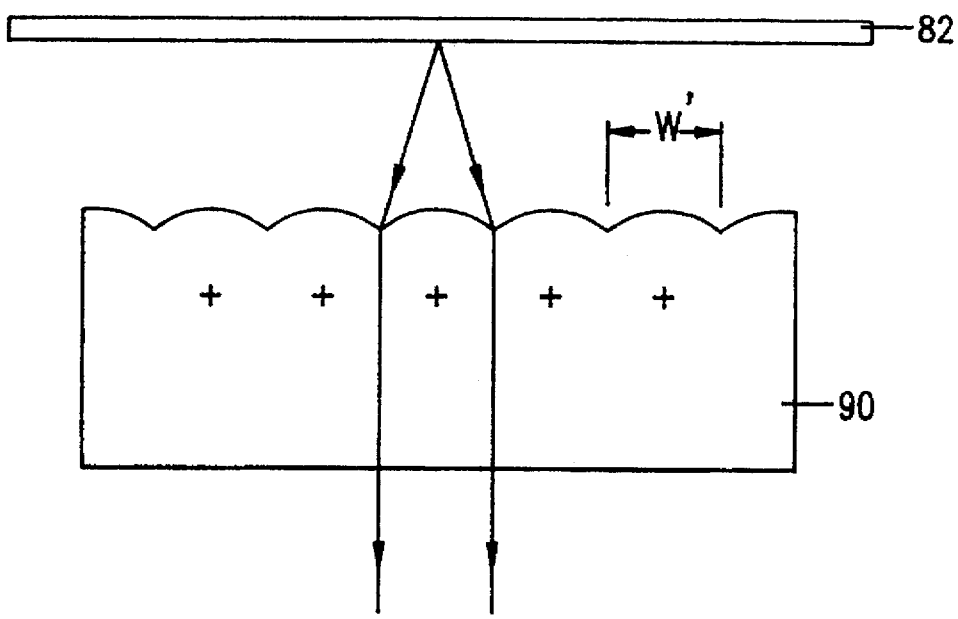

FIG. 12 illustrates a different way to dispose a lenticular screen above an imaging medium or a display medium to separate the views in the composite image. In FIG. 2, the lenticular screen 40 is disposed over a photographic film 70 such that the backside (the flat side) of the lenticular screen is facing the film 70. In FIG. 12A, the lenticular screen is disposed such that the lenticule side is facing the photographic film 70, leaving a gap or therebetween. It should be noted that the thickness of the lenticular screen 40 in FIG. 12A is not critical for determining the focusing properties of the lenticules. It should also be noted that one or more transparent plates can be disposed between the lenticular screen 40 and the film 70. Likewise, a lenticular screen 90 can be disposed with the lenticules facing a composite image 82, as in FIG. 12B, instead of being disposed with the flat side facing the composite image 82, as shown in FIG. 7A.

While the present invention has been described in reference to the preferred forms, it will be obvious to those skilled in the art that many modifications, additions and deletions can be made therein without departing from the spirit and scope of the invention as set forth in the appended claims.

What is claimed is:

1. A method of producing a composite image of a scene comprising the steps of:

a) recording an image of said scene formed by a taking lens on a photographic film disposed in the image plane of said taking lens through a lenticular screen having a contiguous array of lenticules, said recorded image comprising a plurality of linear image zones each underlying a lenticule of said lenticular screen;

b) converting said recorded image into a digital image comprising a plurality of digital image sections each corresponding to a linear image zone in said recorded image, each of said digital image zones comprising a group of N rows of pixels;

c) electronically reversing the order of each group of N rows of pixels in each digital image zone in said digital image; and d) reversing the entire image of said scene.

2. The method of claim 1 wherein said image reversal in Step (d) is effected electronically by reversing the order of the pixel rows in the entirety of said digital image.

3. The method of claim 1 wherein said image reversal in Step (d) is effected optically by recording the image formed by said taking lens in Step (a) through a plane mirror.

4. A method of producing a composite image of a scene comprising the steps of:

a) recording an image of said scene formed by a taking lens on a photographic film disposed in the image plane of said taking lens through a barrier strip plate having a plurality of alternate blocking and clear strips, said recorded image comprising a plurality of linear image zones each underlying a dear strip of said barrier strip plate;

b) converting said recorded image into a digital image comprising a plurality of digital image sections each corresponding to a linear image zone in said recorded image, each of said digital image zones comprising a group of N rows of pixels;

c) electronically reversing the order of each group of N rows of pixels in each digital image zone in said digital image; and d) reversing the entire image of said scene.

5. An apparatus for producing a composite image of a scene comprising:

a) a taking lens for forming an image of said scene on a photographic film disposed in the image plane of said taking lens;

b) a view-separating screen disposed between said taking lens and said photographic film;

c) means for digitizing said recorded image into a digital image comprising a plurality of rows of pixels;

d) means for reversing said digital image; and e) a shutter.

6. The apparatus of claim 5 wherein said reversing means comprises electronic means to reverse the order of the pixel rows in said digital image.

7. The apparatus of claim 5 wherein said view-separating screen is selected from the group consisting of a lenticular screen and a barrier strip plate.

8. A method of producing a 3D picture of a scene comprising the steps of:

a) recording an image of said scene formed by a taking lens on a photographic film disposed in the image plane of said taking lens through a lenticular screen having a contiguous array of lenticules, said recorded image comprising a plurality of linear image zones each underlying a lenticule of said lenticular screen;

b) converting said recorded image into a digital image comprising a plurality of digital image sections each corresponding to a linear image zone in said recorded image, each of said digital image zones comprising a group of N rows of pixels;

c) reversing the entire image of said scene;

d) electronically reversing the order of each group of N rows of pixels in each digital image zone in said digital image to produce a composite image; and e) printing said composite image on a sheet of print material.

9. The method of claim 8 further comprising the step of properly overlaying a viewing screen on top of the composite image printed on said print material, said viewing screen is selected from the group consisting of a second lenticular screen and a barrier strip plate.

10. The method of claim 8 wherein said print material comprises a second viewing screen.

11. The method of claim 8 further comprising the step of electronically separating the composite image into color components for lithographic printing.

12. A method of producing a 3D picture of a scene comprising the steps of:

a) recording an image of said scene formed by a taking lens on a photographic film disposed in the image plane of said taking lens through a barrier strip plate having a plurality of alternate blocking and clear strips, said recorded image comprising a plurality of linear image zones each underlying a clear strip of said barrier strip plate;

b) converting said recorded image into a digital image comprising a plurality of digital image sections each corresponding to a linear image zone in said recorded image, each of said digital image zones comprising a group of N rows of pixels;

c) reversing the entire image of said scene;

d) electronically reversing the order of each group of N rows of pixels in each digital image zone in said digital image to produce a composite image; and e) printing said composite image on a sheet of print material.

13. The method of claim 12 further comprising the step of properly overlaying a viewing screen on top of said composite image printed on said print material, said viewing screen is selected from the group consisting of a lenticular screen and a second barrier strip plate.

14. A method of producing a 3D display of a scene comprising the steps of:

a) recording an image of said scene formed by a taking lens on a photographic film disposed in the image plane of said taking lens through a lenticular screen having a contiguous array of lenticules, said recorded image comprising a plurality of linear image zones each underlying a lenticule of said lenticular screen;

b) converting said recorded image into a digital image comprising a plurality of digital image sections each corresponding to a linear image zone in said recorded image, each of said digital image zones comprising a group of N rows of pixels;

c) reversing the entire image of said scene;

d) electronically reversing the order of each group of N rows of pixels in each digital image zone in said digital image to produce a composite image; and e) presenting said composite image on the back of a viewing screen.

15. The method of claim 14 wherein said image reversal in Step (c) is effected electronically by reversing the order of the pixel rows in the entirety of said digital image.

16. The method of claim 14 wherein said image reversal in Step (c) is effected optically by recording the image formed by said taking lens in Step (a) through a plane mirror.

17. The method of claim 14 wherein said viewing screen is selected from the group consisting of a second lenticular screen and a barrier strip plate.

18. A method of producing a 3D display of a scene comprising the steps of:

a) recording an image of said scene formed by a taking lens on a photographic film disposed in the image plane of said taking lens through a barrier strip plate having a plurality of alternate blocking and clear strips, said recorded image comprising a plurality of linear image zones each underlying a clear strip of said barrier strip plate;

b) converting said recorded image into a digital image comprising a plurality of digital image sections each corresponding to a linear image zone in said recorded image, each of said digital image zones comprising a group of N rows of pixels;

c) reversing the entire image of said scene;

d) electronically reversing the order of each group of N rows of pixels in each digital image zone in said digital image to produce a composite image; and e) presenting said composite image on the back of a viewing screen.

19. The method of claim 18 wherein said viewing screen is selected from the group consisting of a lenticular screen and a second barrier strip plate.

20. A method of producing a composite image of a plurality of scenes comprising the steps of:

a) sequentially and separately exposing the image of each of said scenes formed by a large-aperture taking lens through a different aperture section of said taking lens and through a view-separating screen onto a photographic film disposed in the image plane of said taking lens; and b) reversing the entire image of said scene.

21. The method of claim 20 wherein said view-separating screen is selected from the group consisting of a lenticular screen and a barrier strip plate.

22. The method of claim 20 further comprising the step of:

converting said recorded image into a digital image comprising a plurality of rows of pixels.

23. The method of claim 22 further comprising the step of reversing the order of the pixel rows in said digital image.

24. An apparatus for producing a composite image of a series of N scenes comprising:

a) a taking lens having a large aperture to form an image on a photographic film disposed in the image plane of said taking lens;

b) a lenticular screen having a contiguous array of lenticules disposed between said taking lens and said photographic film, said lenticules having a common longitudinal axis;

c) a plate comprising an opening having a width substantially equal to 1/N the width of the aperture of said taking lens;

d) means for moving said plate in a direction perpendicular to the longitudinal axis of said lenticules on said lenticular screen so as to allow the image of each of said N scenes to be exposed on said photographic film through a different aperture section of said taking lens; and e) a shutter.

25. The apparatus of claim 24 further comprising a plane mirror disposed about said taking lens so as to allow the image formed by said taking lens to be formed through the reflection of said mirror.

26. The apparatus of claim 24 further comprising means for converting said recorded image into a digital image comprising a plurality of rows of pixels.

27. The apparatus of claim 26 further comprising means for reversing the order of the pixel rows in said digital image.

28. An apparatus for producing a composite image of a series of N scenes comprising:
 a) a taking lens having a large aperture to form an image on a photographic film disposed in the image plane of said taking lens;
 b) a barrier strip plate having a plurality of alternate blocking and clear strips disposed between said taking lens and said photographic film;
 c) a plate comprising an opening having a width substantially equal to 1/N the width of the aperture of said taking lens;
 d) means for moving said plate in a direction perpendicular to the length of said clear strips on said barrier strip plate so as to allow the image of each of said N scenes to be exposed on said photographic film through a different aperture section of said taking lens; and
 e) a shutter.

29. The apparatus of claim 28 further comprising means for converting said recorded image into a digital image comprising a plurality of rows of pixels.

30. The apparatus of claim 29 further comprising means for reversing the order of pixel rows in said digital image.

31. A method of producing an animation picture of a plurality of scenes comprising the steps of:
 a) sequentially and separately exposing the image of each of said scenes formed by a large-aperture taking lens through a different section of said taking lens and through a view-separating screen onto a photographic film disposed in the image plane of said taking lens;
 b) reversing the image recorded on said photographic film; and
 c) overlaying a viewing screen on said reversed image.

32. The method of claim 31 wherein said view-separating screen is selected from the group consisting of a lenticular screen and a barrier strip plate.

33. The method of claim 31 wherein said viewing screen is selected from the group consisting of a second lenticular screen and a second barrier strip plate.

34. A method of producing an animation picture of a plurality of scenes comprising the steps of:
 a) sequentially and separately exposing the image of each of said scenes formed by a large-aperture taking lens through a different section of said taking lens and through a view-separating screen onto a photographic film disposed in the image plane of said taking lens;
 b) electronically converting said recorded image on film into a composite image;
 c) presenting said composite image on a surface; and
 d) properly overlaying a viewing screen on top of the composite image presented on said surface.

35. The method of claim 34 wherein said view-separating screen is selected from the group consisting of a lenticular screen and a barrier strip plate.

36. The method of claim 34 further comprising the step of reversing the image optically.

37. The method of claim 34 wherein the image conversion in Step (b) comprises the step of digitizing said recorded image into a digital image comprising a plurality of pixel rows.

38. The method of claim 37 wherein the image conversion in Step (b) further comprises the step of electronically reversing the order of pixel rows in said digital image.

* * * * *